United States Patent [19]

Ishikawa

[11] Patent Number: 4,989,231

[45] Date of Patent: Jan. 29, 1991

[54] MOBILE COMMUNICATION SYSTEM AND ITS CONTROL METHOD

[75] Inventor: Tuguo Ishikawa, Hino, Japan

[73] Assignee: Kabushiki Kaisha Toshiba, Kawasaki, Japan

[21] Appl. No.: 328,657

[22] Filed: Mar. 27, 1989

[30] Foreign Application Priority Data

Mar. 31, 1988 [JP] Japan .................................. 63-79698

[51] Int. Cl.$^5$ .......................................... H04M 11/00
[52] U.S. Cl. ...................... 379/59; 455/33; 455/34
[58] Field of Search ............... 379/59, 60, 63; 455/33, 455/34, 54, 56

[56] References Cited

U.S. PATENT DOCUMENTS 4,012,597 3/1977 Lynk, Jr. et al. ..................... 455/34
4,768,220 8/1988 Yoshihara et al. ..................... 379/63

Primary Examiner—Jin F. Ng
Assistant Examiner—Jhancy Augustus
Attorney, Agent, or Firm—Finnegan, Henderson, Farabow, Garrett and Dunner

[57] ABSTRACT

A mobile communication system and a control method in which a line controller controls speech channels to be used by fixed transceivers. The line controller is coupled to wired telephone lines, and to a plurality of fixed transceivers. The fixed transceivers are coupled to mobile transceivers by radio circuits. The line controller stores the status of available speech channels, and when there is an incoming call on one of the telephone lines or thre is an outgoing call from one of the mobile transceivers, informs one of the fixed transceivers of the status of a set of speech channels. The fixed transceiver subsequently selects one of the set of speech channels, and informs the line controller of its selection so that the status of the speech channels can be updated.

16 Claims, 10 Drawing Sheets

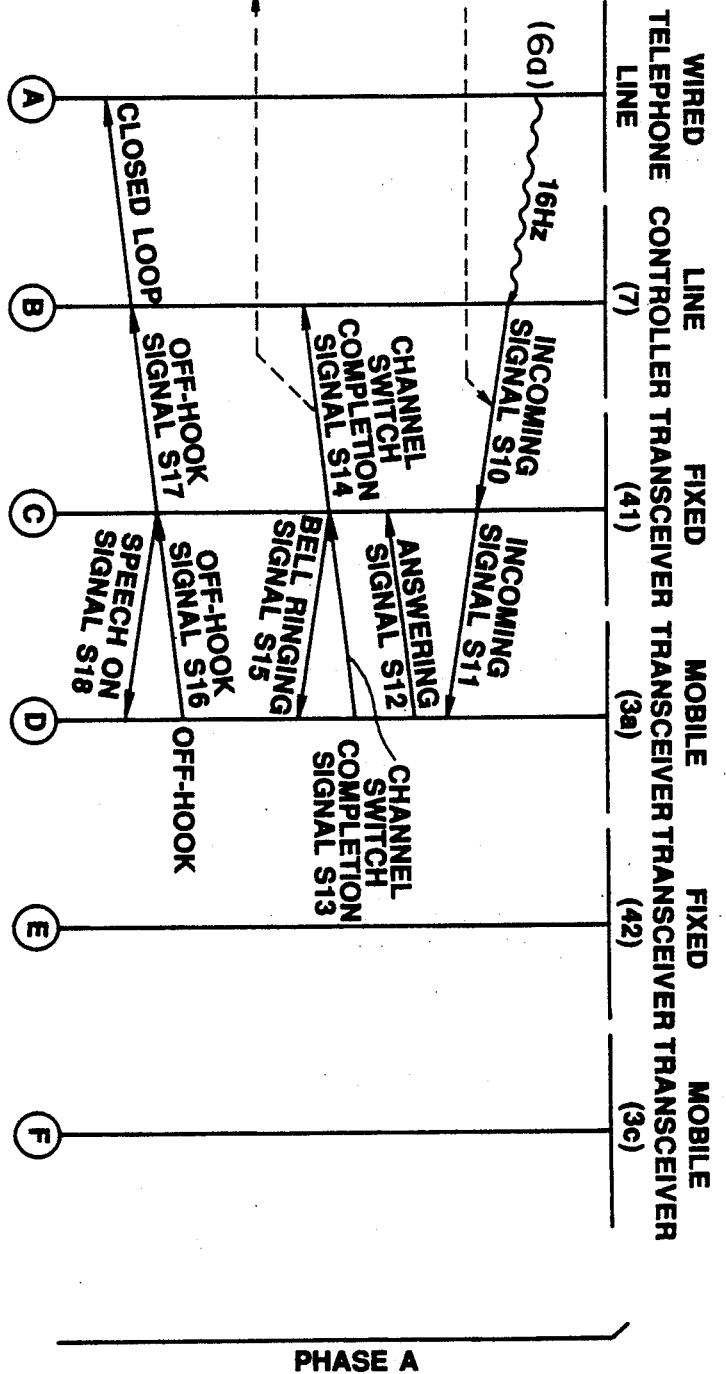
FIG. 3 (PART I)
PHASE A

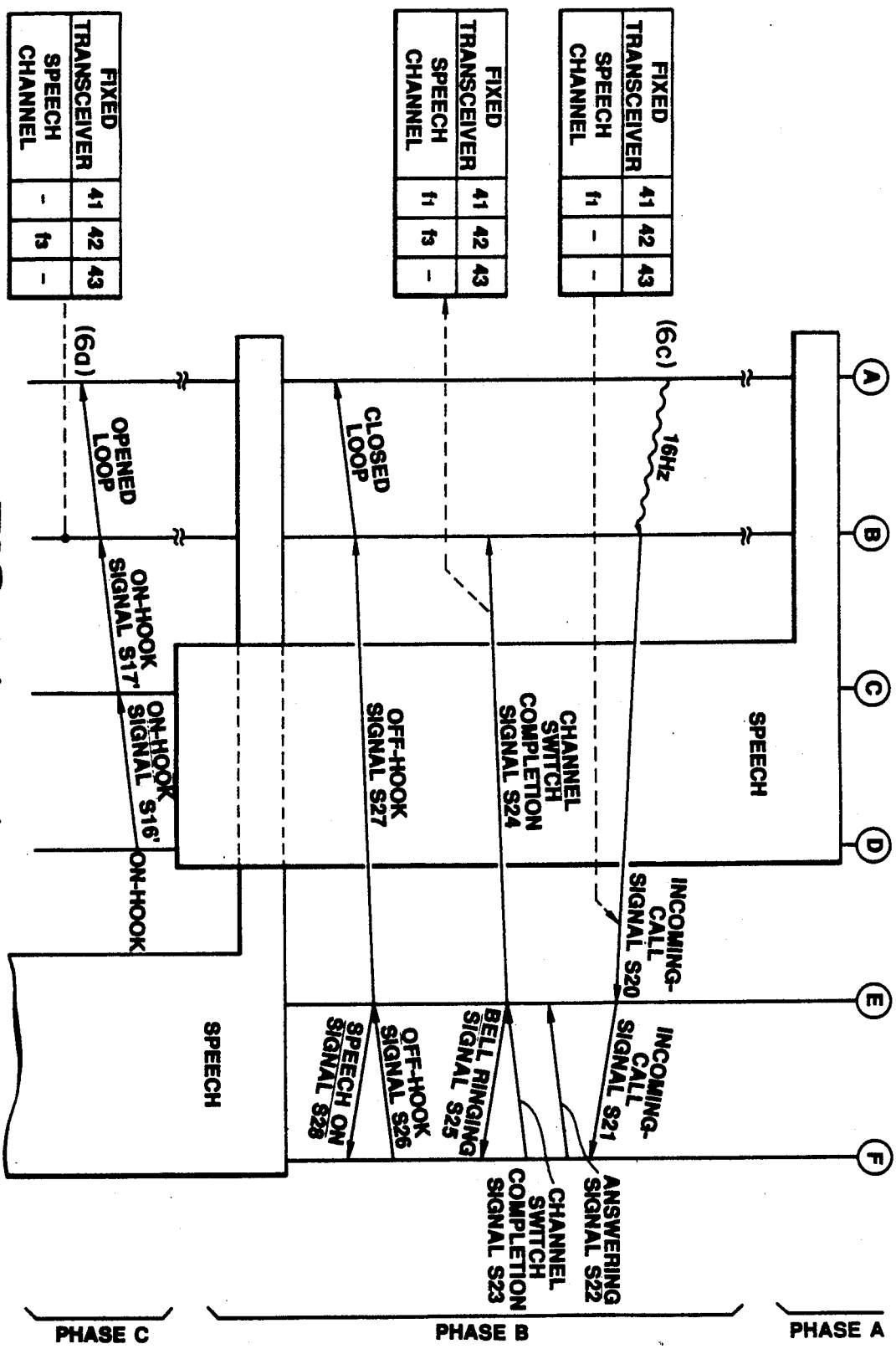
FIG. 3 (PART II)

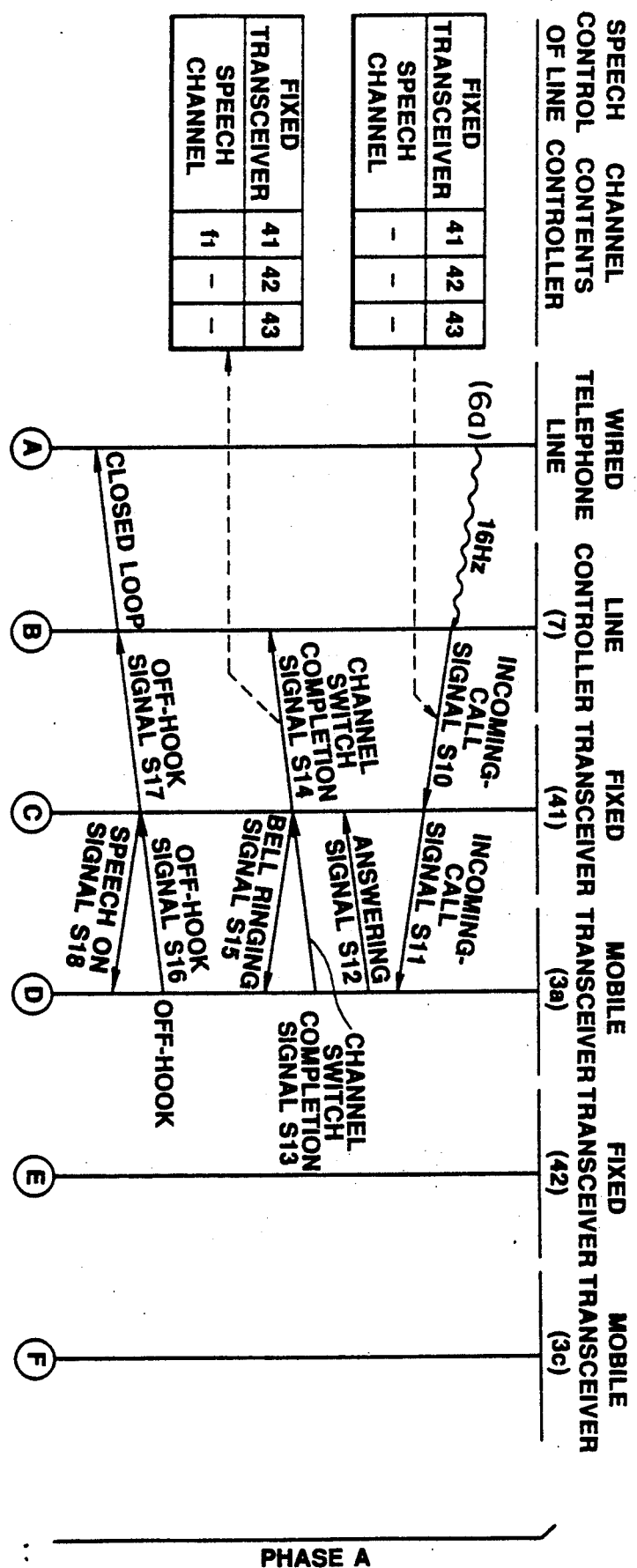
FIG. 4 (PART I)

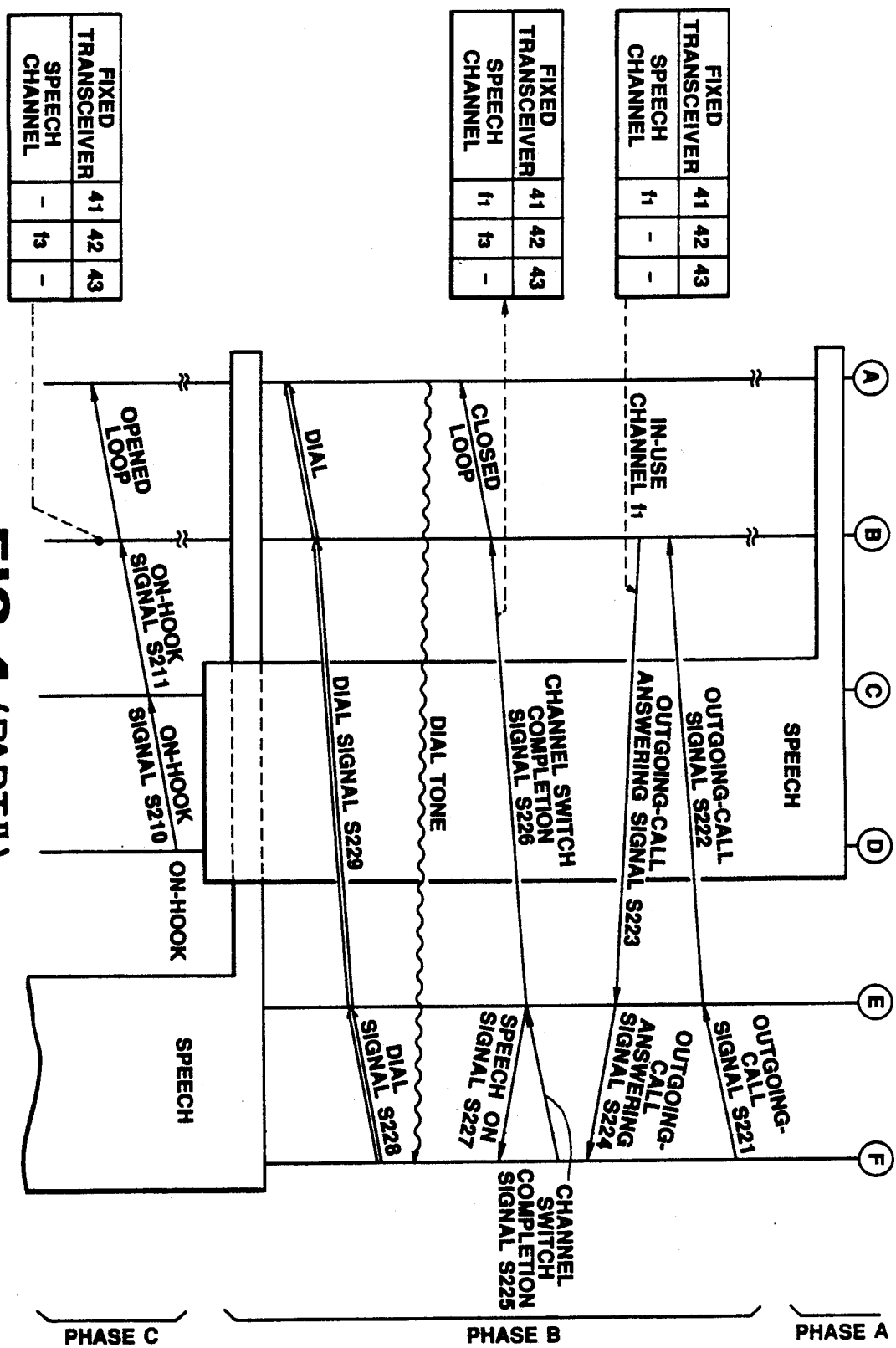
FIG. 4 (PART II)

MOBILE COMMUNICATION SYSTEM AND ITS CONTROL METHOD

BACKGROUND OF THE INVENTION

1. Field of the Invention

The present invention relates to mobile communication systems and their control methods and, more particularly, to a mobile communication system and a control method that avoids radio interference and crosstalk to message or speech channels avoids crossfire or disturbance to a control channels and enables the selection of the speech channels.

2. Description of the Related Art

There has been suggested a mobile communication system in which a plurality of fixed radio transceivers are positioned so that their radio zones (or service areas) partially overlap with each other, whereby communication can be achieved between mobile radio transceivers moving within radio zones, of the fixed tranceivers and wired telephone lines.

FIG. 1 shows a block diagram showing an arrangement of such a sort of mobile communication system. The system of FIG. 1 comprises mobile radio transceivers 3a to 3e, fixed radio transceivers 41 to 43 and a line controller 7. The fixed radio transceivers 41 to 43 have radio zones 51 to 53 respectively. Connected to the line controller 7 are wired telephone lines 6a to 6e which correspond to the mobile radio transceivers 3a to 3e respectively.

The line connecting operation of the mobile communication system will now be explained. Assume that there is an incoming call on the wired telephone line 6a. The line controller 7 then activates the fixed transceiver 41 of the radio zone 51 in which the mobile transceiver 3a corresponding to the wired telephone line 6a is present, and transmits a call indication signal to the mobile transceiver 3a. When the transceiver 3a receives the call indicator signal it, rings its sounder to inform the user of the transceiver 3a of the incoming of a call. When the user responds by picking up the telephone receiver to put the telephone in its off-hook mode, the mobile transceiver 3a sends a call answering signal back to the line controller 7 via the fixed radio transceiver 41. The line controller 7, when detecting the answering signal, connects the wired telephone line 6a to the fixed transceiver 41 to establish speech communication between the party at the other end of the line 6a and the user of the mobile transceiver 3a.

When the user transmits an outgoing call from the mobile transceiver 3a through the fixed transceiver 41 to the line controller 7, the line controller 7 acts to interconnect the wired telephone line 6a and the fixed transceiver 41 and call the desired party leading to the wired telephone network.

In the aforementioned calling and called operations, the speech channel established between the fixed and mobile transceivers 41 and 3a corresponds to an idle speech channel which the controller has retrieved among a plurality of speech channels when the fixed transceiver 41 is in its await mode. When the fixed transceiver sends information on the idle speech channel to the mobile transceiver 3a during calling operation of the mobile transceiver 3a, this causes the fixed and mobile transceivers 41 and 3a to be both switched to the idle speech channel, thus realizing a speech therebetween.

The retrieval time of the idle channel for the fixed and mobile transceivers 41 to 43 and 3a to 3e is restricted to be a time as small as below 100 ms to minimize a response time to a call or a received call. For this reason, this system has had such a problem that, when the electric field intensity of another speech channel already in service at the retrieval timing of the idle channel is reduced due to fading or the like, the fixed transceivers 41 to 43, or the mobile transceivers 3a to 3e, may erroneously judge an in-use speech channel to be idle, thus causing interference between the speech channels. In addition, the system is also defective in that the movement of the mobile transceiver during its speech operation causes the change of propagation state of the electromagnetic waves, thus resulting in occurrence of interference on an identical speech channel.

To eliminate such identical-speech-channel interference, there has been proposed such a method that an interference detecting circuit is provided for each of the fixed and mobile transceivers to switch the current speech channel to a one related to a frequency causing no interference. However, in the case where a frequency difference between the both channels is small, it is difficult to detect interference itself and thus it is impossible to reliably prevent interference.

Furthermore, if the frequencies of two fixed radio transceivers A and B satisfy the following relation, $$fc = 2 \cdot (fc + \Delta fs) - (fc + 2\Delta fs)$$

where fc is the frequency of the control channel, $\Delta fs$ is an interval between speech channels, $fc + \Delta fs$ is the frequency of transmit waves of the fixed transceiver A, and $fc + 2\Delta fs$ is the frequency of transmit waves of the fixed transceiver B, then there has occurred such a problem that radio waves of the same frequency as the control channel are generated due to intermodulation between the respective transmit waves of the both fixed transceivers A and B, thus causing the crosfire or disturbance of the control channel.

It is an object of the present invention to a mobile communication system and a control method that can avoid these problems of the prior art, avoid radio interference and crosstalk to message or speech channels, avoid crossfire or disturbance to a control channel, and realize stable speech communiction.

SUMMARY OF THE INVENTION

In accordance with the present invention, the above object is attained by providing a mobile communication system in which when speech channels are established between ones of fixed radio transceivers and assicuated ones of mobile radio transceivers, the associated fixed transceivers inform a line controller of their established speech channels, and in the presence of an incoming call from a wired telephone line or in the presence of an outgoing call from one of the mobile transceivers, the line controller informs the fixed transceiver associated with the incoming or outgoing call of information on the speech channels in use or impossible to use on the basis of the informed speech channels.

Each of the fixed transceivers, after having established a speech channel with the associated mobile transceiver, informs the line controller of this speech channel. In this manner, the line controller controls the speech channels used by all the fixed transceivers.

In the case where there is an incoming call from one of the wired telephone lines or an outgoing call from one of the mobile transceivers, the line controller informs the fixed transceiver corresponding to the calling or called mobile transceiver of information on the speech channels in use or information on the speech channels impossible to use.

As a result, the fixed transceiver can select one of the speech channels which does not cause any interference or crosstalk and disturbance to the control channel.

In accordance with the present invention, the line controller controls the speech channels being used by the fixed transceivers and prior to the channel select operation of the fixed transceiver, informs the fixed transceiver of the contents of the speech channels controlled by the line controller, such that the fixed transceiver can easily select the speech channel which can avoid the crosstalk and interference caused by the use of an identical speech channel and also the disturbance to the control channel by mutual interference, whereby stable speech communication can be secured even in the presence of fading or the like.

BRIEF DESCRIPTION OF THE DRAWINGS

FIGS. 3I, 3II and 4I, 4II show a sequence diagram of an embodiment of speech channel select control based on the present invention respectively;

DESCRIPTION OF THE PREFERRED EMBODIMENTS

Figure 1:
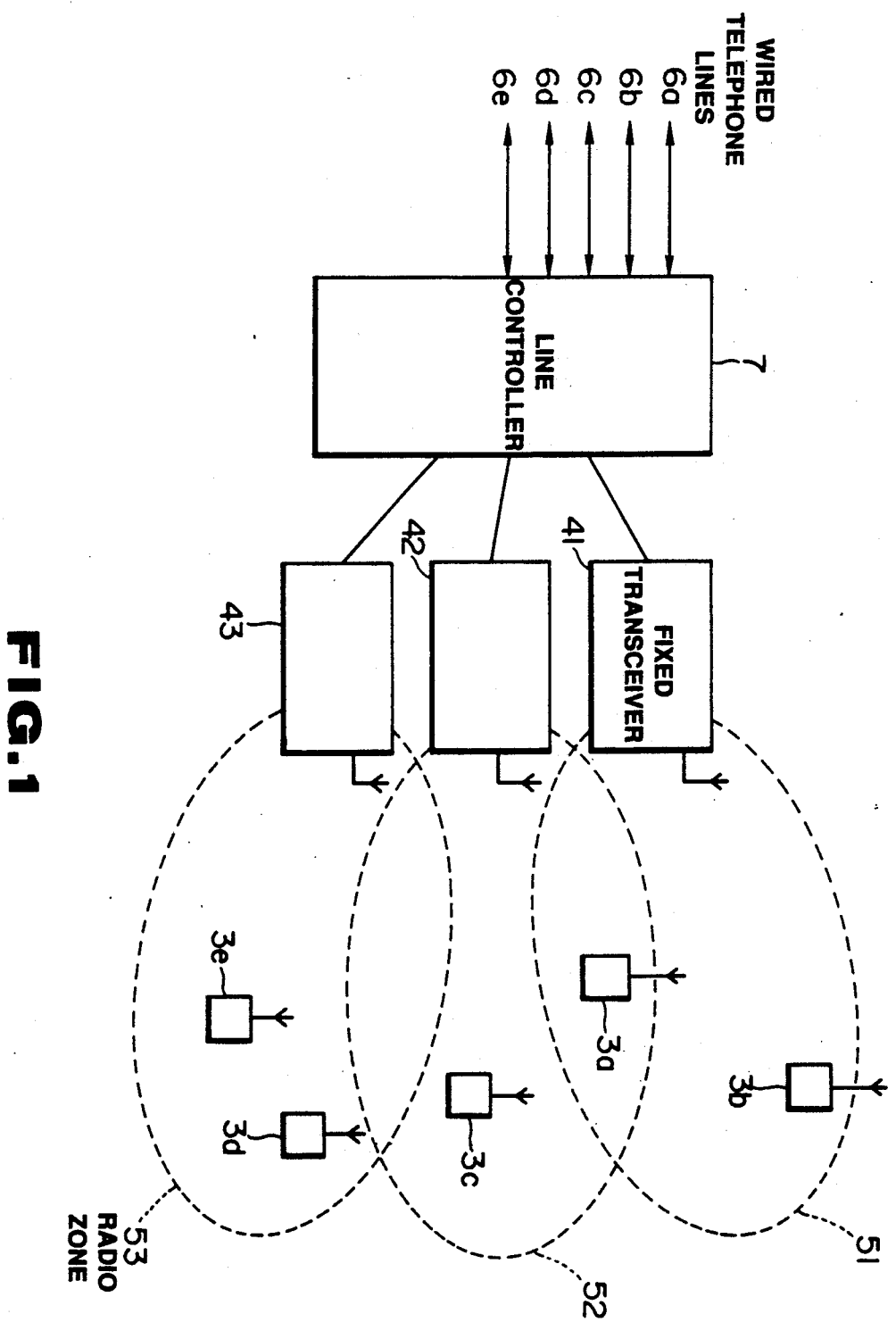
FIG. 1 is a block diagram showing a general arrangement of a mobile communication system.
Figure 2:
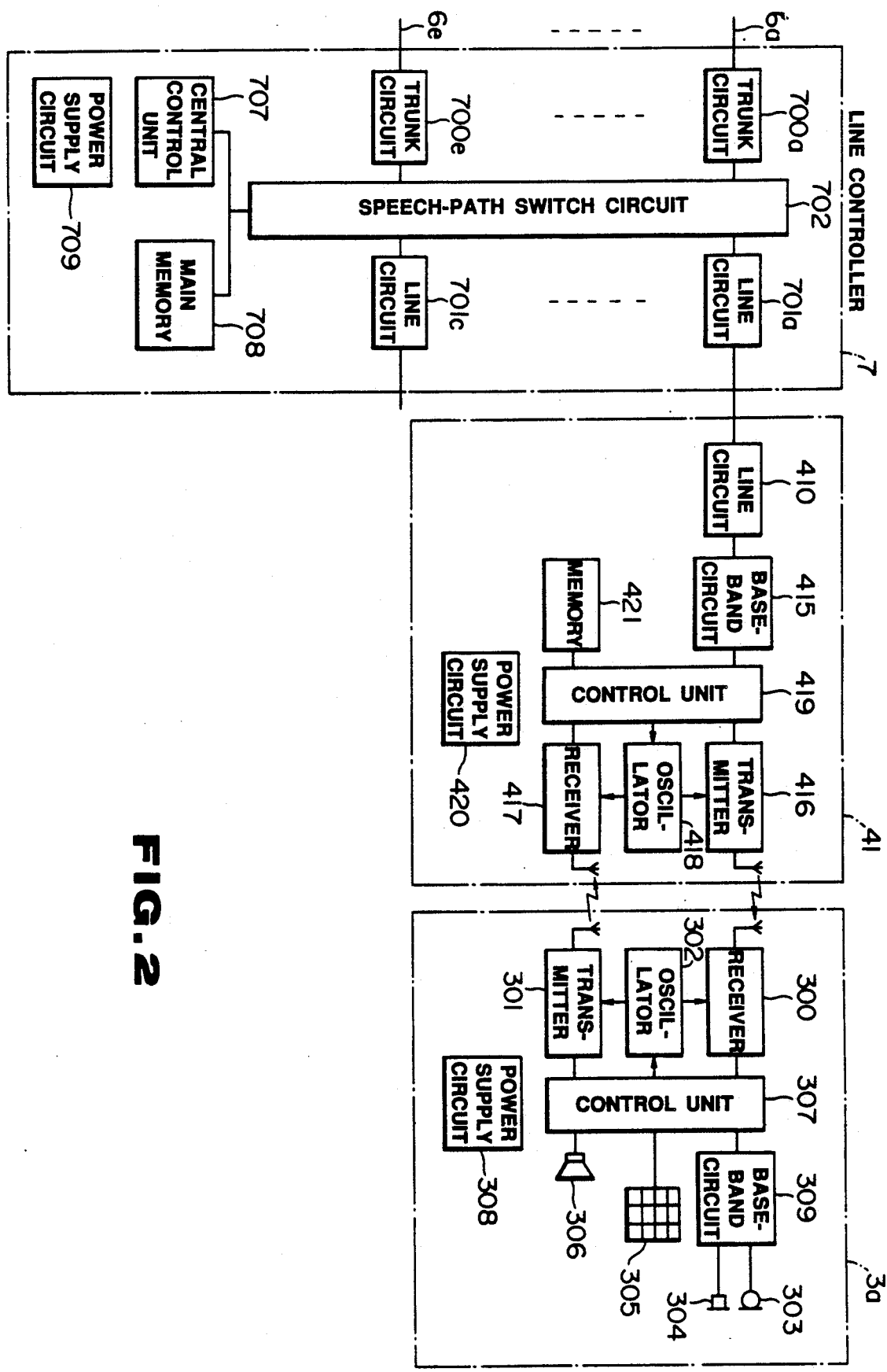
FIG. 2 is a block diagram showing a detailed arrangement of the system.

FIG. 2, shows a detailed diagram of a mobile communication system in accordance with an embodiment of the present invention, corresponding to the diagram shown in FIG. 1. Components common to both FIGS. 2 and 1 are denoted by the same reference numerals.

In FIG. 2, the line controller 7 connected to the wired telephone lines 6a to 6e includes trunk circuits 700a to 700e connected to the wired telephone lines 6a to 6e respectively, line circuits 701a to 701c coupled to the fixed transceivers 41 to 43 respectively, a speech-path switching circuit 702 provided between the trunk circuits 700a to 700e and the line circuits 701a to 701c to establish speech channels between the trunk circuits 700a to 700e and the line circuits 701a to 701c respectively, a central control unit 707 for controlling the speech path establishing operation of the speech path switching circuit 702, a main storage 708 for storing various sorts of control information, and a power supply circuit 709 for driving the entire line controller 7. The line circuit 701a of the line controller 7 is connected to the fixed transceiver 41. In FIG. 2, the fixed transceivers 42 and 43 to be connected to the line circuits 701b and 701c are omitted and not illustrated.

The fixed transceiver 41 includes a line circuit 410 connected to the line circuit 701a of the line controller 7, a base-band circuit 415 connected to the line circuit 410, a control unit 419, transmitter 416 for transmitting a signal to the mobile transceiver 3a in the form of electromagnetic waves, a receiver 417 for receiving a radio signal from the mobile transceiver 3a, an oscillator 418 controlled by the control unit 419 to determine the transmit frequency of the transmitter 416 and the receive frequency of the receiver 417, a memory 421 for storing various sorts of control information, and a power supply circuit 420 for driving the fixed transceiver 41.

The mobile transceiver 3a, which corresponds to the wired telephone line 6a, includes a receiver 300 for receiving a radio signal, for example, from the fixed transceiver 41, a transmitter 301 for transmitting a signal in the form of electromagnetic waves, for example, to the fixed transceiver 41, a control unit 307, an oscillator 302 controlled by the control unit 307 to determine the receive frequency of the receiver 300 and the transmit frequency of the transmitter 301, a base-band circuit 309 for processing a signal from a microphone 303 and a signal to a user receiver 304, a dial pad 305 coupled to the control unit 307 and provided with dial keys and a hook switch, a sounder 306 for generating a ringing tone, and a power supply circuit 308 for driving the mobile transceiver 3a. In FIG. 2, the mobile transceivers 3b to 3e corresponding to the wired telephone lines 6b to 6e are omitted and not illustrated.

The operation of the foregoing embodiment will next be explained by referring to sequence diagrams of FIGS. 3 and 4 and flowcharts of FIGS. 5 to 7 as well as a signal format of FIG. 8.

FIG. 3 shows the operation of the system when there is an incoming call on the wird telephone line 6a followed by another incoming call on the wired telephone line 6c. In the drawing, when an incoming call signal of 16 Hz arrives at the wired telephone line 6a in a phase A and then detected by the trunk circuit 700a of the line controller 7, the line controller 7 sends an incoming call signal S10 via the line circuit 701a to the fixed transceiver (in the illustrated embodiment, 41) located in the vicinity of the mobile transceiver 3a associated with the wired telephone line 6a. The incoming call signal contains, in addition to information on the identification signal of the mobile transceiver 3a, information on the speech channels being used by the other fixed transceivers 42 and 43. The incoming call signal S10 is transmitted with a signal format as shown in FIG. 8. The signal format shown in FIG. 8 is used in signal transfer between the fixed and mobile transceivers 41 to 43 and 3a to 3e and consists of a synchronization code 10, a control code 20, and an identification (ID) code 30 for the mobile and fixed transceivers and an additional information code 40. In this case, the control code 20 contains the incoming call signal indicative of the presence of an incoming call, and the additional information code 40 contains information on the speech channels being used by the other fixed transceivers 42 and 43, that is, the speech channel control contents of the line controller. The speech channel control contents included in the incoming call signal S10 in this case are shown by blocks at the left side of FIG. 3. The incoming call signal S10, which is received at the line circuit 410 of the fixed transceiver 41 is then applied to the control circuit 419 through the base-band circuit 415. The control circuit 419 determines the absence of any speech channel being used by the other fixed transceivers 42 and 43 on the basis of the contents of the additional information code of the received signal S10, that is, the speech channel control contents. Then the fixed transceiver 41 reads an idle speech channel previously stored in the memory 421 in its await mode. Incidentally, a signal format used in signal transfer between the line controller 7 and the fixed transceivers 41 to 43 is similar to the foregoing signal format shown in FIG. 8.

Figure 5:
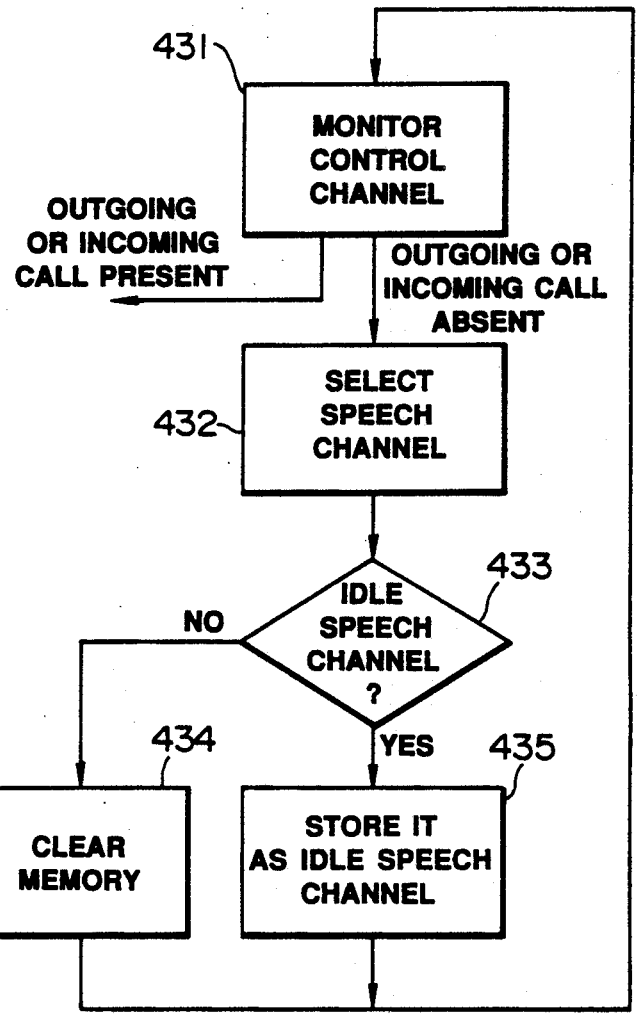
FIG. 5 is a flowchart showing an example of fixed-transceiver idle-speech-channel retrieval operation in the embodiment.

An example of the retrieval operation of an idle speech channel in a fixed transceiver is shown by a flowchart in FIG. 5. In the drawing, a fixed transceiver monitors the control channel (step 431). In the absence of any incoming or outgoing call, that is, in the await mode, the fixed transceiver sequentially selects the speech channels (step 432) and checks whether or not the selected speech channel is idle (step 433). If the selected speech channel is idle, then the fixed transceiver stores the selected speech channel in the memory 421 as an idle speech channel (step 435). If the selected speech channel is already occupied, then the fixed transceiver clears the selected channel out of the memory 421 (step 434).

The control unit 419 of the fixed transceiver 41 selects the speech channel of, for example, f1 from the set of idle speech channels previously stored in the await mode, and transmits an incoming call signal S11 containing the specification information of the frequency f1 speech channel and the identification signal information of the mobile transceiver 3a, from the transmitter 416 through the control channel to the mobile transceiver 3a.

In the mobile transceiver 3a, when the control unit 307 is applied with the incoming call signal S11 (including its own identification signal) received at the receiver 300, the control unit returns an answering signal S12 from the transmitter 301 through the control channel to the fixed transceiver 41 and then controls the oscillator 302 and switches the channel of the receiver 300 and transmitter 301 to the frequency f1 speech channel to check whether or not the frequency f1 speech channel is idle.

The fixed transceiver 41, after transmitting the incoming call signal S11 containing the specification information of the f1 speech channel, controls the oscillator 418 to switch the channel of the transmitter 416 and the receiver 417 to the frequency f1 speech channel.

As a result of checking the frequency f1 speech channel, after the mobile transceiver 3a confirms that the f1 channel is idle, it transmits a switch completion signal S13 indicative of the completion of change-over to the speech channel of frequency f1, from the transmitter 301 to the fixed transceiver 41.

The control unit 419 of the fixed transceiver 41, when accepting the channel switch completion signal S13 from the receiver 417 receiving it from the mobile transceiver 3a, the fixed transceiver 41 sends a channel switch completion signal S14 including the information of the frequency f1 speech channel established between the fixed and mobile transceivers 41 and 3a, from the control unit 419 via the base-band circuit 415 and the line circuit 410 to the line controller 7. At the same time, the fixed transceiver 41 also transmits a bell ringing signal S15 from the transmitter 416 to the mobile transceiver 3a to call the user of the transceiver 3a. In the format of the channel switch completion signal S14 as shown in FIG. 8, the control code contains the contents indicative of channel switch completion and the additional code contains the information of the speech channel of frequency f1, i.e., the control contents of the speech the speech channel of the fixed transceiver included in the channel switch completion signal S14 are shown by blocks at the left side of FIG. 3.

The central control unit 707 of the line controller 7, when receiving the channel switch completion signal from the line circuit 701a, the control unit stores in the main storage 708 the control contents of the speech channel of the fixed transceiver contained in the channel switch completion signal, that is, the information of the frequency f1 speech channel to control the speech channels of the fixed transceivers 41, 42 and 43.

The control unit 307 in the mobile transceiver 3a, when detecting the bell ringing signal S15 that is transmitted from the fixed transceiver 41 and received at the receiver 300, the control unit 307 causes the sounder 306 to generate a ringing tone therefrom. In response to the ringing tone generated from the sounder 306 of the mobile transceiver 3a, when the user of the mobile transceiver 3a operates the hook switch of the dial pad 305 into its off-hook mode, the control unit 307 of the mobile transceiver 3a causes the transmitter 301 to transmit an off-hook signal S16 therefrom to the fixed transceiver 41. When the fixed transceiver 41 receives the off-hook signal S16 at the receiver 417 and the signal is then sent from the receiver 417 to the control unit 419, this causes the control unit 419 to send an off-hook signal S17 to the line controller 7 under control of the base-band circuit 415 and the line circuit 410. At the same time, the fixed transceiver 41 transmits a speech on signal S18 to the mobile transceiver 3a.

The central control unit 707 of the line controller 7, when receiving the off-hook signal S17 from the line circuit 701a, closes a DC loop between the line controller 7 and the wired telephone line 6a. This causes establishment of a speech path between the line 6a and the mobile transcever 3a through the line controller 7 and the fixed transceiver 41, which results in that the mobile transceiver 3a is put in its speech mode.

At this time, the main storage 708 of the line controller 7 stores, as shown by blocks at the left side of FIG. 3, the information that the speech channel of frequency f1 is being used.

Assume that speech communication between the wired telephone line 6a and the mobile transceiver 3a is achieved in such a manner as mentioned above and thereafter an incoming call signal S20 arrives at another wired telephone line 6c in a phase B. Then the line controller 7 sends the incoming call signal S20 to the fixed transceiver in the vicinity of the mobile transceiver 3c associated with the line 6c, for example, to the fixed transceiver 42, in the similar manner to the operation mentioned above. The incoming call signal S20 contains the information indicative of the speech channels being used by the other fixed transceivers. In the example of FIG. 3, since the fixed transceiver 41 is using the speech channel of frequency f1 under such condition as has been mentioned above, the incoming call signal S20 includes the information indicative of the fact that the frequency f1 speech channel shown by blocks at the left side of FIG. 3 is being used by the fixed transceiver 41.

The fixed transceiver 42 selects one of the speech channels with respect to the mobile transceiver 3c on the basis of the aforementioned f1 channel information and the information of the idle channels previously retrieved in its await mode. For example, when the idle channels previously retrieved in the await mode are of frequencies f2 and f3, the fixed transceiver avoids the selection of the channel of frequency f2 that may cause disturbance to the control channel through intermodulation and selects the channel of frequency f3 from among the idle channels of frequencies f2 and f3.

Figure 6:
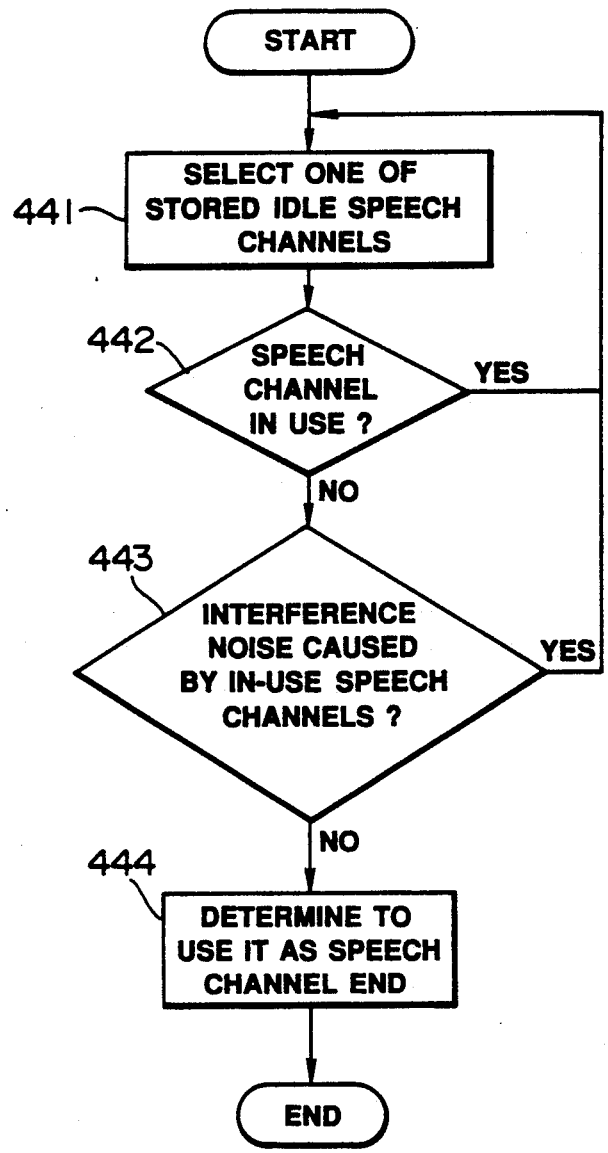
FIG. 6 is a flowchart showing an example of how to determine a speech channel to be used in the embodiment.

The select operation of the aforementioned speech channels wil be further explained by referring to a flowchart shown in FIG. 6.

In FIG. 6, the fixed transceiver 41 first selects one of the idle speech channels stored in the memory 421 (step 441), and then judges whether or not the seleted idle speech channel is now in use (step 442). If the selected idle speech is not in use, the fixed transceiver checks whether or not the use of this selected channel causes interference waves or noise with other speech channels being used (step 443). In the case of the judgement of no possibility of generation of interference noise, the fixed transceiver determines the selected speech channel to be used (step 444). The judgement of the selected channel in use at the step 442 or the judgement of a possibility of generation of the interference noise at the step 443 will cause control to return to the step 441 to select another one of the idle speech channels stored in the memory 421. In this way, the fixed transceiver selects one of the idle speech channels that has a lesser possibility of generation of such interference noise, and determines it as a speech channel to be used.

The fixed transceiver 42 transmits through the control channel to the mobile transceiver 3c an incoming call signal S21 that information indicative of the speech channel of frequency f3 thus selected and determined as well as the identification signal of the mobile transceiver 3c.

Thereafter, as in the phase B, the mobile transceiver 3c transmits an answering signal S22 and a channel switch completion signal S23 to the fixed transceiver 42 and subsequently the fixed transceiver 42 sends a channel switch completion signal S24 to the line controller 7. And when the user of the mobile transceiver 3c responds to a bell ringing signal S25 received from the fixed transceiver 42 by means of an off-hook operation, this causes the mobile and fixed transceivers 3c and 42 to send off-hook signals S26 and S27 to the fixed transceiver 42 and to the line controller 7 respectively, with the result that a speech path or speech mode is established between the wired telephone line 6c and the mobile transceiver 3c. Further, a speech on signal S28 is transmitted from the fixed transceiver 42 to the mobile transceiver 3c. Since the mobile transceiver 3c is put in the speech mode with the speech channel of frequency f3, this means that the main memory 708 of the line controller 7 stores therein information indicative of the speech channels of frequencies f1 and f3 being used by the fixed transceivers 41 and 42 respectively. Such a state is shown by blocks at the left side of FIG. 3.

In the subsequent phase C, an on-hook operation of the mobile transceiver 3a causes on-hook signals S16' and S17' to be sent from the mobile transceiver 3a to the fixed transceiver 41 and from the fixed transceiver 41 to the line controller 7 respectively, whereby the DC loop between the line controller 7 and the wired telephone line 6a is released. As a result, the speech mode comes to an end and such information that the fixed transceiver 41 is using the speech channel of frequency f1 is cleared out of the main memory 708.

FIG. 4 shows the operation of the mobile communication system when there is an incoming call on the wired telephone line 6a and then there is an outgoing call from the mobile transceiver 3c. That part of the system operation of FIG. 4 in the phase A is identical with that shown in FIG. 3.

In the phase B, when the mobile transceiver 3c gives a call, it transmits an outgoing call signal S221 to the fixed transceiver 42 in the vicinity of the mobile transceiver 3c. The fixed transceiver 42, in response to the outgoing call signal S221, sends an outgoing call signal S222 to the line controller 7. The line controller 7, when receiving the outgoing call signal S222, sends an outgoing-call answering signal S223 to the fixed transceiver 42. The outgoing-call answering signal S223 contains the control contents of the speech channels of the line controller 7, that is, information indicative of in-use speech channels stored in the main memory 708 of the line controller 7. In the illustrated example of FIG. 4, the speech channel of frequency f1 is being used by the fixed transceiver 41 and the information indicating the in-use speech channels included in the outgoing-call answering signal S223 is as shown by blocks at the left side of FIG. 4.

The fixed transceiver 42, on the basis of the aforementioned in-service channel information and information on idle channels previously retrieved in the await mode, selects one of the speech channels to be used with respect to the mobile transceiver 3c. Assuming, for example, that the idle channels previously retrieved in the await mode are of frequencies f2 and f3, then the fixed transceiver avoids the selection of the frequency f2 channel that may cause any disturbance to the control channel due to intermodulation from among the speech channels of frequencies f2 and f3, and selects the channel of frequency f3 therefrom.

The select operation of the aforementioned speech channels will be detailed by a flowchart of FIG. 6.

The fixed transceiver 42 transmits via the control channel to the mobile transceiver 3c an outgoing-call answering signal S224 which contains the information of the frequency f3 speech channel thus selected and determined as well as the identification signal of the mobile transceiver 3c. Thereafter, the fixed transceiver 42 is switched to the speech channel of frequency f3.

The mobile transceiver 3c, when receiving the outgoing-call answering signal S224, switches the current speech channel to the speech channel of frequency f3 on the basis of the information of the frequency f3 channel included in the signal S224, ascertains that the speech channel of frequency f3 is idle, and transmits a channel switch completion signal S225 to the fixed transceiver 42.

The fixed transceiver 42, when receiving the channel switch completion signal S225, transmits a speech signal S227 to the mobile transceiver 3c. The fixed transceiver 42 also sends a channel switch cmpletion signal S226 to the line controller 7 which in turn closes a DC loop with respect to the line 6c when receiving the signal S226. This causes a dial tone to be transmitted from the line 6c to the mobile transceiver 3c.

In the side of the mobile transceiver 3c, when the user confirms the reception of the dial tone and performs its dial operation, the transceiver 3c transmits a dial signal S228 to the fixed transceiver 42.

The fixed transceiver 42, when receiving the dial signal from the mobile transceiver 3c, sends it to the line controller 7 as a dial signal S229 and the signal S229 is then sent from the line controller 7 onto the wired line. In response to a ringing tone based on the sending of the dial signal, when a party telephone set (not shown) coupled at the other end of the telephone line answers to it, the mobile transceiver 3c is put in a speech mode with respect to the party telephone set.

When the mobile transceiver 3c enters its speech mode through the speech channel of frequency f3, this means that the main memory 708 of the line controller 7 stores therein information indicative of the fact that the speech channels of frequencies f1 and f3 are being used by the fixed transceivers 41 and 42 respectively, which state is shown by blocks at the left side of FIG. 4.

Thereafter in the phase C, an on-hook operation of the mobile transceiver 3a causes on-hook signals S210 and S211 to be input from the mobile transceiver 3a to the fixed transceiver 41 and from the transceiver 41 to the line controller 7 respectively, so that the DC loop between the line controller 7 and the wired telephone line 6a is released. At this stage, the speech mode comes to an end and the information indicative of the speech channel of frequency f1 being used by the fixed transceiver 41 is cleared from the main memory 708.

In this way, the line controller 7 controls the speech channels being used by the respective fixed transceivers 41 to 43 and in the presence of an incoming call on one of the wired telephone lines 6a to 6e, informs one of the fixed transceivers 41 to 43 of the information of the speech channels being used, and the corresponding fixed transceiver selects one of the speech channels by referring to the informed contents. As a result, such a speech channel as to reliably prevent the crosstalk or interference between the speech channels and the disturbance to the control channel can be selected.

In the example of FIGS. 3 or 4 for example, even when the fixed and mobile transceivers 42 and 3c erroneously judge that the frequency f1 speech channel is idle due to fading or the like, the line controller 7 can inform them that the frequency f1 speech channel is already in use. For this reason, it can be beforehand prevented that the f1 speech channel is erroneously selected and that the common use of an identical channel causes undesirable crosstalk or interference.

In this case, the fixed and mobile transceivers 42 and 3c can have a change to correctly confirm that the f1 speech channel is now in use, only in the idle-channel detecting operation of the await mode. However, the idle-channel detecting operation is not continuously but intermittently carried out at constant intervals because of the effective use of the control channel. For this reason, when the fixed transceiver 42 can accidentally previously detect that the frequency f1 speech channel is in use during its channel select operation, it can, instead of selecting the frequency f2 speech channel having a possibility of mutual interference to the frequency f1 speech channel, select the speech channel of frequency f3. When the f1 speech channel enters its use mode during a time period from the idle-channel detecting operation via the control channel monitoring operation and the operation of receiving the outgoing call signal S221 to the operation of sending the outgoing-call answering signal S224, the fixed transceiver may incorrectly regard the f1 channel as an idle one and select it.

Such drawback can be solved by performing the continuous in-use-channel detecting operation concurrently with the idle-channel detecting operation. This method, however, is defective in that the method requires the fixed transceiver to monitor the control channel with a less time, which results in that, when the mobile transceiver transmits an outgoing call signal onto the control channel, the fixed transceiver cannot immediately detect it, thus increasing the time occupied by the control channel and elongating the response time.

Accordingly, as in the present embodiment, by controlling speech channels in use at the line controller 7 and informing the fixed transceivers of the controlled contents, a speech channel preventing any crosstalk and interference can be selected while the time occupied by the control channel is not increased.

Although the information of the speech channels now actually in use has been transmitted to the fixed transceiver in the foregoing embodiment, such a speech channel as actually not used but causes mutual interference, for example, the speech channel of frquency f2 in the example of FIGS. 3 and 4 may be regarded as an in-use channel and may be informed to the fixed transceiver as an unusable speech channel.

According to yet another embodiment of the present invention, information on the array positions of the fixed transceivers may be previously stored in the line controller so that, when a fixed transceiver A is using the f1 speech channel and another fixed transceiver B is to form a new speech channel, the line controller may judge the positional relationship between the both fixed transceivers A and B, and when the both fixed transceivers are located at such positions that radio waves from one of the both transceiver do not reach the other (that is, when the both are not in their overreach positional reationship), the f1 speech channel may be informed to the fixed transceiver B as an unused one.

Figure 7:
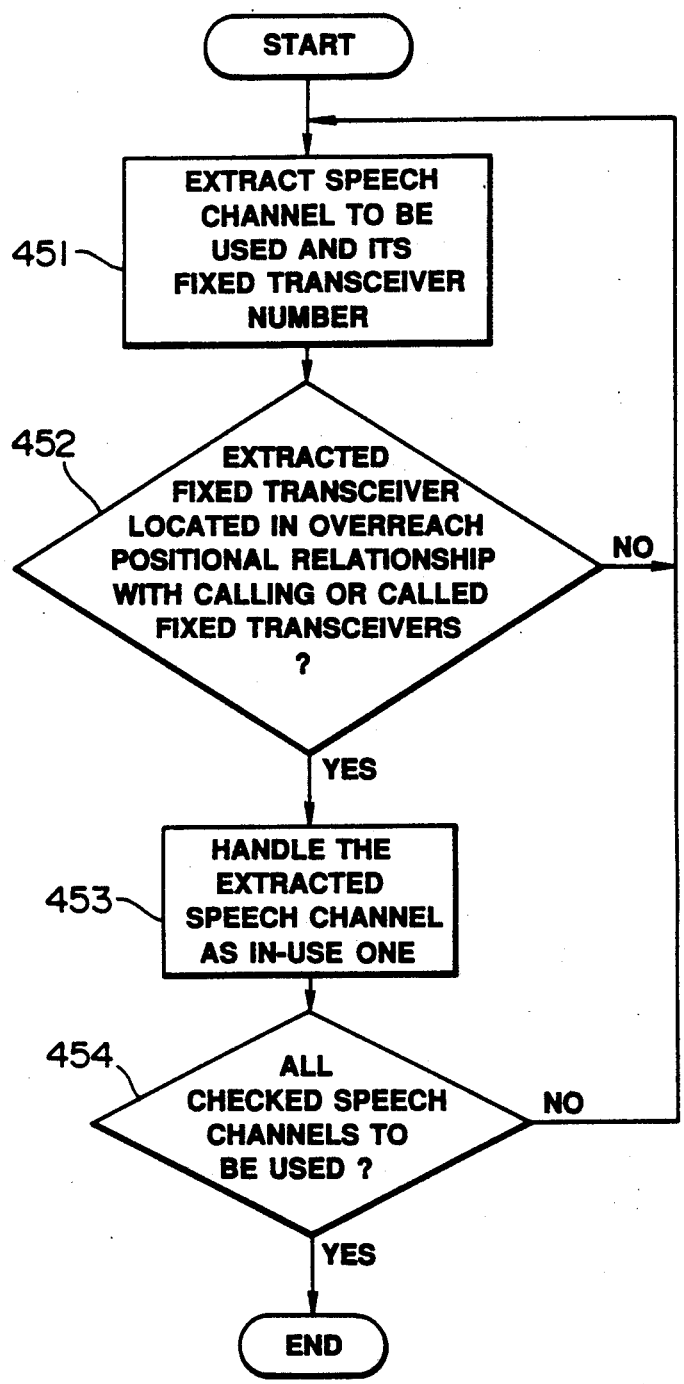
FIG. 7 is a flowchart showing an example of how to create information on speech channels used by fixed transceivers in the embodiment.
Figure 8:
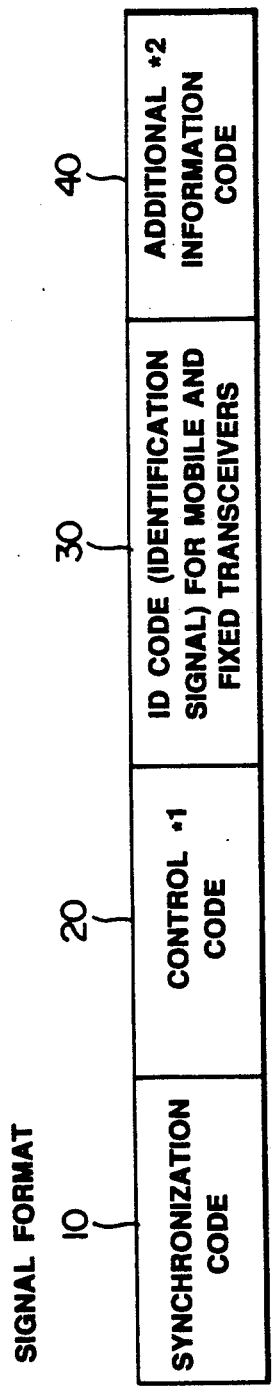
FIG. 8 sows an example of signal format used in the embodiment.

Shown in FIG. 7 is a flowchart for explaining how to create information on in-use speech channels to be stored in the main memory 708 of the line controller 7 in the embodiment arranged as mentioned above.

More in detail, in FIG. 7, a speech channel to be used and the number of the fixed transceiver corresponding thereto are first extracted from the stored contents of the main memory 708 (step 451). Then, it is judged at a step 452 whether or not the fixed transceiver number extracted is in the overreach positional relationship with a fixed transceiver which has already started a calling or a receiving operation and is waiting designation of a speech channel to be used. If the judgement is YES, then the speech channel corresponding to the extracted fixed transceiver number is handled as an in-use speech channel (step 453). If the judgement is NO at the step 452, then the speech channel corresponding to the extracted fixed transceiver number is not handled as an in-use one. Such operation is repeated until all the speech channels to be used are checked (step 454).

With such an arrangement, it becomes unnecessary for the fixed transceiver to judge whether or not to cause mutual interference or the like and thus the circuit configuration of the fixed transceiver can be simplified.

What is claimed is:

1. A mobile communication system comprising:
a plurality of mobile transceivers;
a plurality of radio circuits being capable of operating on a plurality of speech channels;
a plurality of fixed transceivers coupled through the radio circuits to the mobile transceivers;
a line controller coupled to a plurality of wired telephone lines and coupled to the fixed transceivers, including memory means for storing and outputting from time to time a used speech channel list;
first informing means, responsive to a call from the wired telephone lines or a call from a mobile transceiver and responsive to the list of used speech channels, for informing a fixed transceiver, proximate to a called or calling mobile transceiver, of the current used speech channel list; and means, responsive to the list of used speech channels, for setting a speech channel between the fixed transceiver and the mobile transceiver, including circuitry in each of the fixed transceivers for selecting a speech channel.

2. A mobile communication system as set forth in claim 1, wherein said fixed transceivers each include second informing means for informing said line controller, when the speech channel is set by said speech-channel setting means of the set speech channel, and said line controller memory means updates its contents in response to the second informing means.

3. A mobile communication system as set forth in claim 2, wherein said second informing means sends said set speech channel information to said line controller together with a channel switch completion signal sent from said fixed transceiver.

4. A mobile communication system as set forth in claim 1, wherein said first informing means, responsive to a call from the wired telephone lines, sends a used speech channel list together with an incoming call signal transmitted from said line controller to the fixed transceiver.

5. A mobile communication system as set forth in claim 1, wherein said first informing means, responsive to a call from a mobile transceiver, sends a used speech channel list together with an outgoing-call answering signal transmitted from said line controller to the fixed transceiver. a plurality of radio circuits being capable of operating on a plurality of speech channels;

6. A mobile communication system as set forth in claim 1, wherein said fixed transceivers each have retrieval means for retrieving idle speech channels, and said speech-channel setting means has means for selecting one of the idle speech channels retrieved by said retrieval means, said one idle speech channel causing no interference noise to the in-use speech channels informed by said first informing means.

7. A mobile communication system as set forth in claim 1, wherein said fixed transceivers each have retrieval means for retrieving idle speech channels and memory means for storing the idle speech channels retrieved by said retrieval means, and said speech channel setting means sets a speech channel on the basis of information on the in-use speech channels informed by said first informing means and information on the idle speech channels stored in said fixed transceiver memory means.

8. A mobile communication system comprising:
a plurality of mobile transceivers;
a plurality of radio circuits being capable of operating on a plurality of speech channels;
a plurality of fixed transceivers coupled through the radio circuits to the mobile transceivers;
a line controller coupled to a plurality of wired telephone lines and coupled to the fixed transceivers, including memory means for storing and outputting from time to time a used speech channel list;
first informing means, responsive to a call from the wired telephone lines or a call from a mobile transceiver and responsive to the list of used speech channels, for informing a fixed transceiver, proximate to a called or calling mobile transceiver, of an unusable speech channel list, the first informing means discriminating unusable speech channels on the basis of the current used speech channel list; and means, responsive to the list of used speech channels, for setting a speech channel between the fixed transceiver and the mobile transceiver, including circuitry in each of the fixed transceivers for selecting a speech channel.

9. A mobile communication system as set forth in claim 8, wherein said fixed transceivers each include second informing means for informing said line controller, when the speech channel is set by said speech-channel setting means of the set speech channel, and said line controller memory means updates its contents in response to the second informing means.

10. A mobile communication system as set forth in claim 9, wherein said second informing means sends said set speech channel information to said line controller together with a channel switch completion signal sent from said fixed transceiver.

11. A mobile communication system as set forth in claim 8, wherein said first informing means, responsive to a call from the wired telephone lines, sends an unusable speech channel list together with an incoming call signal transmitted from said line controller to the fixed transceiver.

12. A mobile communication system as set forth in claim 8, wherein said first informing means, responsive to a call from a mobile transceiver, sends an unusable speech channel list together with an outgoing-call answering signal transmitted from said line controller to the fixed transceiver.

13. A mobile communication system as set forth in claim 8, wherein said fixed transceivers each have retrieval means for retrieving idle speech channels, and said speech-channel setting means has means for selecting one of the idle speech channels retrieved by said retrieval means except for said unusable speech channels informed by said first informing means.

14. A mobile communication system as set forth in claim 8, wherein said fixed transceivers each have retrieval means for retrieving idle speech channels and memory means for storing the idle speech channels retrieved by said retrieval means, and said speech channel setting means sets a speech channel on the basis of information on the unusable speech channels informed by said first informing means and information on the idle speech channels stored in said fixed transceiver memory means.

15. A mobile communication system comprising:
a plurality of mobile transceivers;
a plurality of radio circuits being capable of operating on a plurality of speech channels;
a plurality of fixed transceivers coupled through the radio circuits to the mobile transceivers;
a line controller coupled to a plurality of wired telephone lines and coupled to the fixed transceivers, including memory means for storing and outputting from time to time a used speech channel list or an unusable speech channel list;
first informing means, responsive to a call from the wired telephone lines or a call from a mobile transceiver and responsive to the current speech channel list, for informing a fixed transceiver, proximate to a called or calling mobile transceiver, of a used speech channel list or an unusable speech channel list;

means, responsive to the speech channel list, for setting a speech channel between the fixed transceiver and the mobile transceiver, the setting means including means for selecting a speech channel which employs circuitry in the fixed transceiver in cooperation with circuitry in the mobile transceiver; and second informing means, responsive to the speech channel setting means, for informing said line controller of the set speech channel, the line controller memory means updating its contents in response to the second informing means.

16. A method for controlling a mobile communication system having a plurality of mobile transceivers, a plurality of radio circuits capable of operating on a plurality of speech channels, a plurality of fixed transceivers coupled through the radio circuits to the mobile transceivers, and a line controller coupled to a plurality of wired telephone lines and coupled to the fixed transceivers, including memory means for storing and outputting a used speech channel list or an unusable speech channel list, comprising the steps of:

informing, in response to a call from the wired telephone lines or a call from a mobile transceiver and responsive to the list of used speech channels, a fixed transceiver, proximate to a called or calling mobile transceiver, of a used speech channel list or an unusable speech channel list;

setting, in part based on the list of used speech channels, a speech channel between the fixed transceiver and the mobile transceiver, the setting step including the step of selecting a speech channel, part of the selecting step being performed at the fixed transceiver;

informing the line controller of the set speech channel; and updating the line controller memory means contents after the previous step.

* * * * *